(12) United States Patent
Maercovich et al.

(10) Patent No.: US 6,879,320 B2
(45) Date of Patent: Apr. 12, 2005

(54) AUTO-CONTROL DISPLAY DEVICE INCORPORATED WITH LAVATORY SYSTEM

(75) Inventors: Jorge Maercovich, Los Angeles, CA (US); Jackson Lu, Rowland Heights, CA (US); Leo Maercovich, Los Angeles, CA (US); Shao-Kuang Liu, Pan Chiao (TW); Hsiang-Chih Kao, Pan Chiao (TW)

(73) Assignee: Advanced Modern Technologies Corp., Los Angeles, CA (US)

( * ) Notice: Subject to any disclaimer, the term of this patent is extended or adjusted under 35 U.S.C. 154(b) by 0 days.

(21) Appl. No.: 10/243,222

(22) Filed: Sep. 12, 2002

(65) Prior Publication Data

US 2003/0020704 A1 Jan. 30, 2003

(51) Int. Cl.[7] .............................................. G09P 13/00
(52) U.S. Cl. ........................................ 345/211; 4/302
(58) Field of Search .............................. 345/211; 4/302, 4/304–305, 313–314; 705/14

(56) References Cited

U.S. PATENT DOCUMENTS 5,603,127 A * 2/1997 Veal ........................... 4/246.1

2001/0031913 A1 * 10/2001 Ito et al. ..................... 600/300

FOREIGN PATENT DOCUMENTS

| JP | 02002021149 A | * | 1/2002 |
| KR | 2001025679 A | * | 4/2001 |
| KR | 2002015426 A | * | 2/2002 |
| WO | WO0118315 A1 | * | 3/2001 |

* cited by examiner

Primary Examiner—Richard Hjerpe
Assistant Examiner—M. Fatahiyar
(74) Attorney, Agent, or Firm—Raymond Y. Chan; David and Raymond Patent Group

(57) ABSTRACT

An auto-control display device for incorporating with a lavatory system in a service area such as a lavatory, includes a sensor for sensing a use of the lavatory system, a display unit which is interacted with the sensor and is placed at an eye viewing location within the service area, and an information center, which is connected between a power source and the display unit, for storing at least an electronic information, wherein when the sensor detects the use of the lavatory system, the information center automatically activates the display unit to display the electronic information, and when the sensor detects that the use of the lavatory system is completed, the display unit is automatically deactivated by the information center.

17 Claims, 4 Drawing Sheets

AUTO-CONTROL DISPLAY DEVICE INCORPORATED WITH LAVATORY SYSTEM

BACKGROUND OF THE PRESENT INVENTION

1. Field of Invention

The present invention relates to an advertisement and/or message display, and more particularly to an auto-control display device incorporated with a lavatory system, wherein while in usage of the lavatory system, the auto-control display device is automatically switched on by detecting the user's movement to deliver a preset message to the user.

2. Description of Related Arts

Various advertising channels for the promotion of goods are available nowadays. Manufacturers and retailers advert their goods through a mass media such as television, radio, or press media like newspapers or magazines. Other alternative media of advertising channels include billboards and posters. The billboard is generally constructed on a huge steel made support frame along a freeway or on the wall of a building. The poster is generally posted in an eye viewing location, such as a wall of a restaurant, a panel at a bus stop, or corridors of a shopping mall, for easily attracting attention.

However, it is very expensive to build a billboard such that manufacturers and retailers may not be able to afford the rental fee and/or the monthly fee to post their advertisements thereon. Also, a poster is defined as a static display that contains unalterable printed material such that the poster must be manually changed after the promotion period. In addition, the common drawback in the use of a billboard and a poster is that people may not pay attention to the billboard or the poster while they are walking by or driving by it. In other words, most people will not stop and read the advertisement everyday even if the advertisement is very attractive.

In order to obtain the attention of the target audience to read or listen to the advertisement, the best place to put on the advertisement is in the lavatory. For example, about 50% of the customers in a restaurant will visit the lavatory and each of them may spend at least 30 seconds in the lavatory. Therefore, an advertiser may place posters in the lavatory at an eye viewing location. However, the same poster is normally posted for a certain period of time. After the promotion period, the used posters are generally thrown away, resulting in a waste of resources. Moreover, the static display of the monotonous poster cannot really get people's attention.

SUMMARY OF THE PRESENT INVENTION

A main object of the present invention is to provide an auto-control display device incorporated with a lavatory system, wherein while in usage of the lavatory system, the auto-control display device is automatically switched on by detecting a user's movement to deliver a preset message to the user.

Another object of the present invention is to provide an auto-control display device incorporated with a lavatory system, wherein the advertiser can select a specific advertisement at one or more predetermined advertising areas for every advertised service or product, so as to maximize the advertising effect within a limited advertisement budget. Therefore, no money or resources will be waste for posting wrong advertisements at the wrong time in the wrong place for the wrong target audience.

Another object of the present invention is to provide an auto-control display device incorporated with a lavatory system, wherein the advertisement is capable of being transmitted by means of audio and/or video with capabilities that allow for real time information.

Another object of the present invention is to provide an auto-control display device incorporated with a lavatory system, wherein the advertisement is remote controlled and monitored through an electronic network from a central control center.

Another object of the present invention is to provide an auto-control display device incorporated with a lavatory system, wherein the auto-control display device comprises a sensor for sensing the use of the lavatory system so as to activate the display screen. In other words, when the user finishes using the lavatory system, the display screen is automatically switched off or to standby mode for energy saving.

Another object of the present invention is to provide an auto-control display device incorporated with a lavatory system, wherein the sensor is capable of connecting to an auto flush actuation system that automatically controls the flushing operation of the lavatory system when the usage of the lavatory system is complete.

Accordingly, in order to accomplish the above objects, the present invention provides an auto-control display device for incorporating with a lavatory system in a service area such as a lavatory, comprising:

means for sensing a use of the lavatory system;

a display unit which is electrically connected to the sensing means and adapted for placing at an eye viewing location within the service area; and an information center, which is electrically connected between a power source and the display unit, for storing at least an electronic information, wherein when the sensing means detects the use of, the lavatory system, the information center automatically activates the display unit for displaying the electronic information, and when the sensing means detects that the use of the lavatory system is completed, the display unit is automatically deactivated by the information center.

In addition, the present invention further comprises a method of posting electronic information by an auto-control display device in a public service area, which comprises the steps of:

(a) providing a plurality of regional display units in a plurality of regional service centers each having a service area and a central control center networked with the regional service centers;

(b) providing at least an electronic information in each of the regional service centers, which is maintained and controlled by the central control center;

(c) sensing a presence of an audience within the respective service area; and (d) activating the respective display unit for displaying the electronic information to the audience.

DETAILED DESCRIPTION OF THE PREFERRED EMBODIMENT

Figure 1:
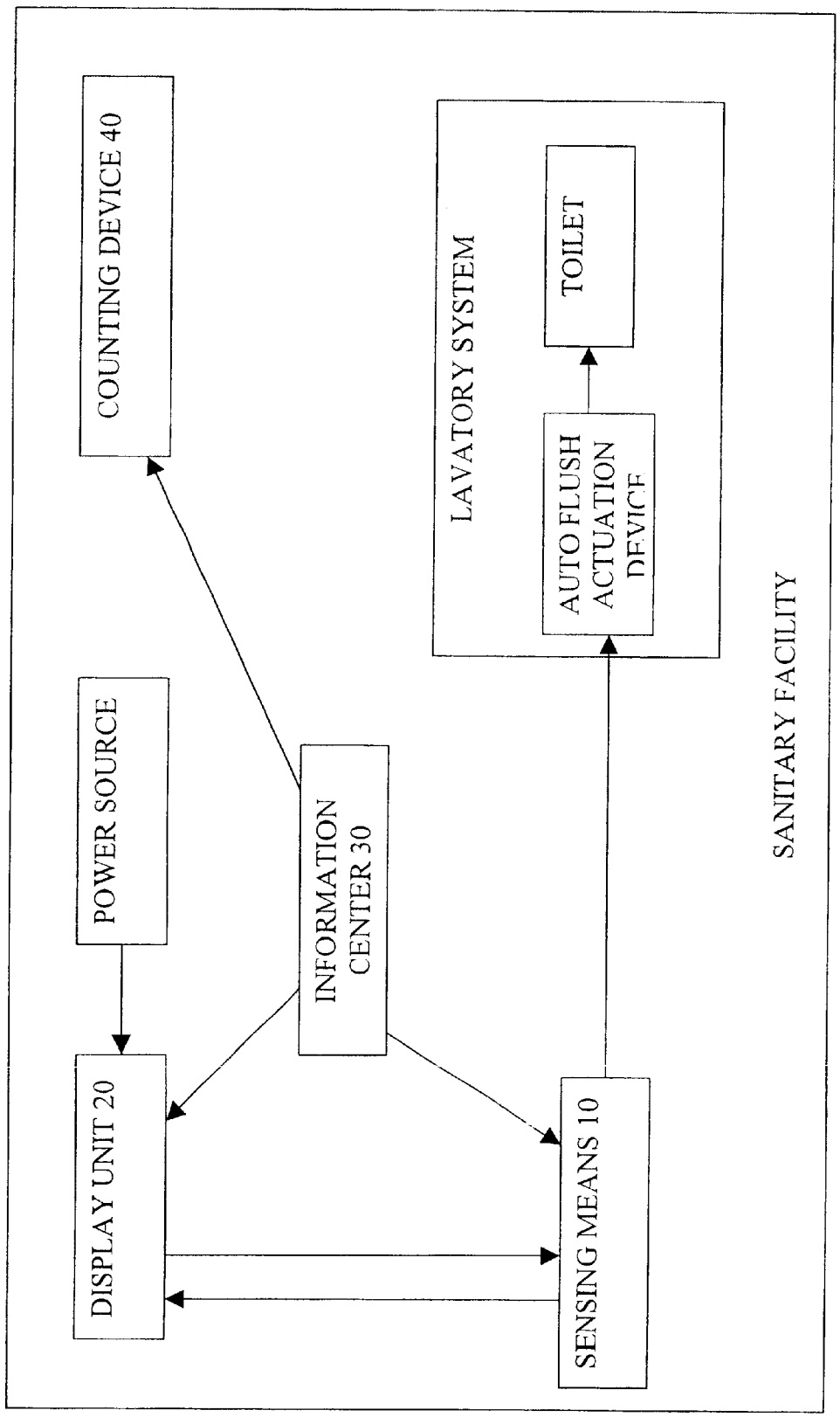
FIG. 1 is a block diagram of an auto-control display device incorporated with a lavatory system according to a preferred embodiment of the present invention.
Figure 2:
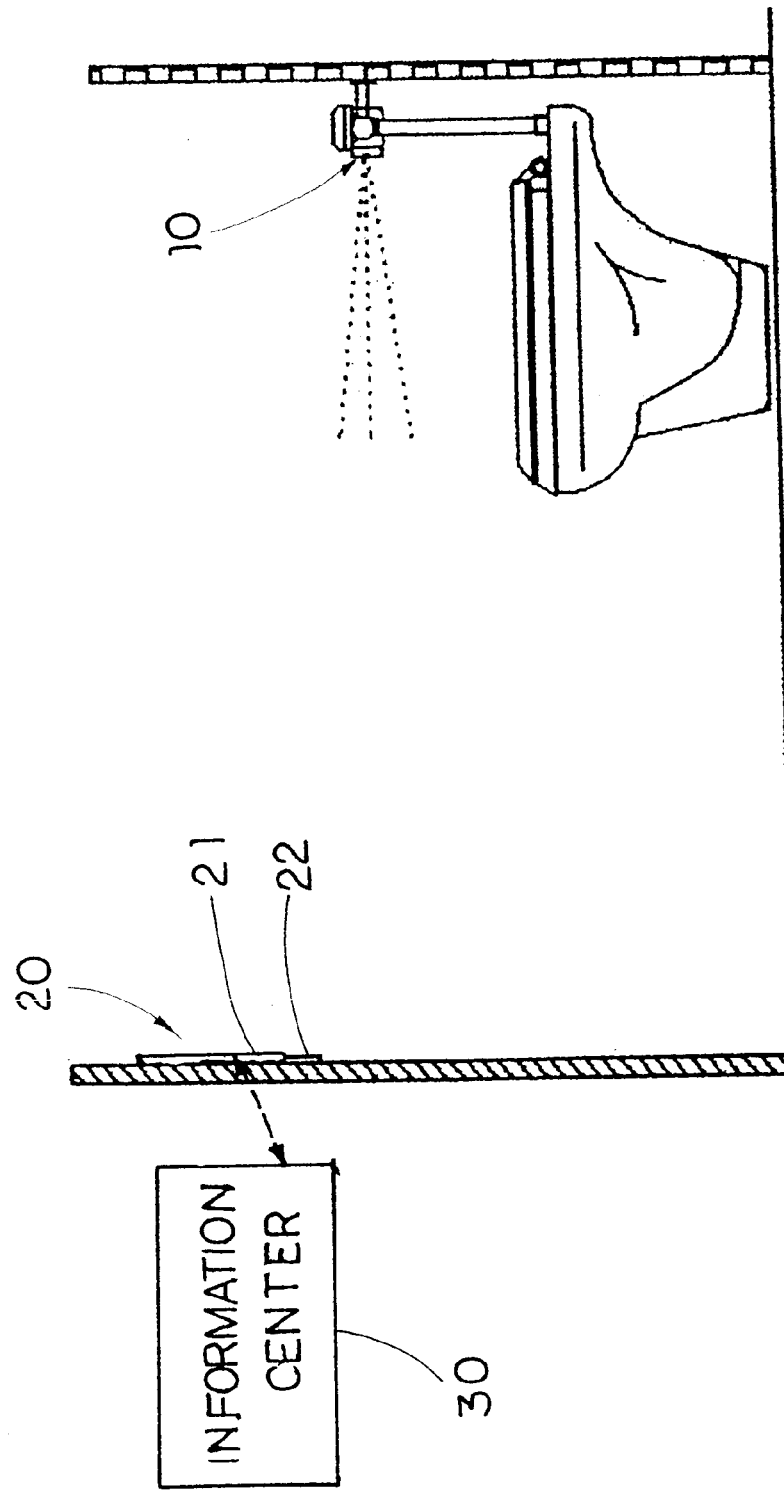
FIG. 2 is a perspective view of the auto-control display device incorporated with the lavatory system according to the above preferred embodiment of the present invention.

Referring to FIGS. 1 and 2 of the drawings, an auto-control display device incorporated with a lavatory system in a lavatory is illustrated, wherein the lavatory system generally comprises a toilet and a flush actuation device.

The auto-control display device comprises means 10 for sensing use of the lavatory system, a display unit 20 which is interacted with the sensing means 10, via such as electrical connection or wireless remote transmission, and adapted for placing at an eye viewing location within a service area such as the lavatory as illustrated in the present preferred embodiment, and an information center 30, which is connected between a power source P and the display unit 20, for storing electronic information.

When the sensing means 10 detects a use of the lavatory system, the information center 30 automatically activates the display unit 20 for displaying the electronic information, and when the sensing means 10 detects that the use of the lavatory system is completed, the display unit 20 is automatically deactivated by the information center 30, that is the display unit 20 can be either automatically switched off or switched to a standby mode.

According to the preferred embodiment, the sensing means 10 is an infrared sensor, a body heat detector, or a motion sensor installed into a specific location of the service area such that the sensing means 10 is adapted for detecting a user motion when the user occupies the service area.

The display unit 20 comprises a display screen 21, which is preferably, but not limited to, a Liquid Crystal Display (LCD) monitor screen, and a speaker 22 adapted for displaying video information and broadcasting audio information of the electronic information respectively. Moreover, the display unit 20 may be capable of displaying full color graphics, text, and video and includes sound capabilities. As shown in FIG. 2, the display unit 20 is mounted at a position facing the user at an eye viewing location when the user uses the lavatory system.

Figure 3B:
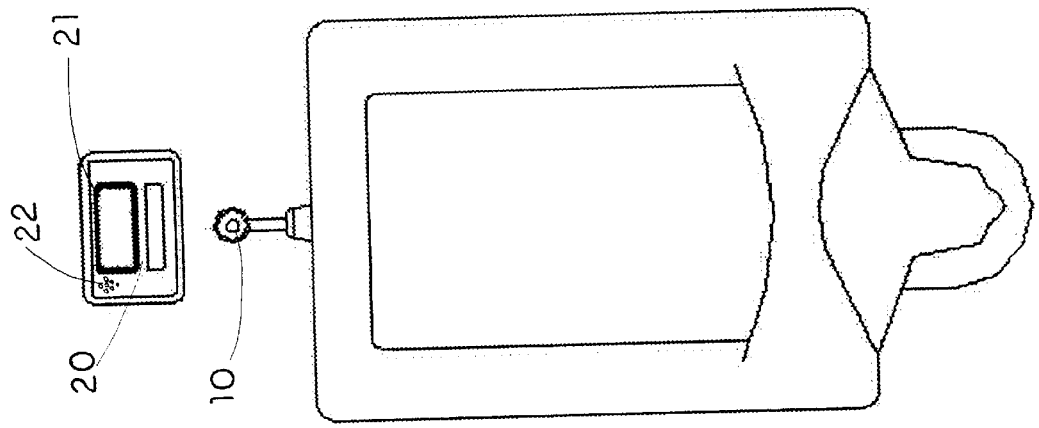
FIGS. 3A and 3B illustrate an alternative use of the auto-control display device incorporated with the lavatory system according to the above preferred embodiment of the present invention.
Figure 3A:
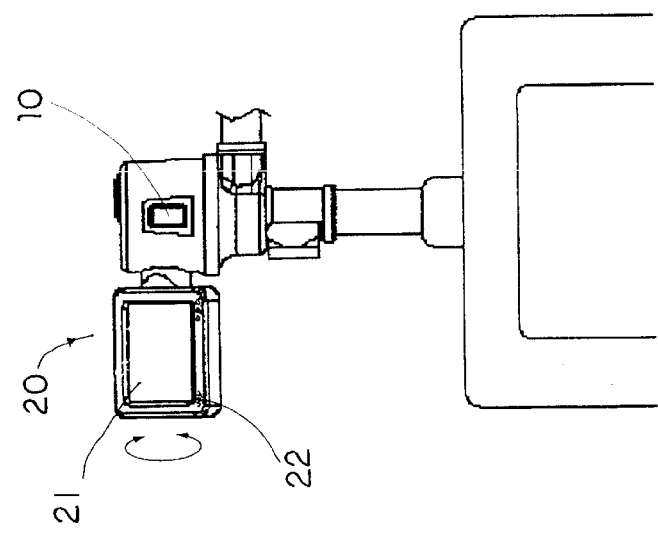

The information center 30 functions as an information providing center wherein the electronic information is stored therein. The electronic information can be digital videos and/or graphic pictures with audio information. The business owner of the lavatory where the display unit 20 is installed can make an introduction of its business into such video and audio electronic information to be displayed and broadcasted via the display unit 20. Advertisement information for various services and products of different companies can be made into video files to be displayed at the display units 20 under the control of the information center 30. Of course, the advertisement information may also contain audio files to broadcast from the speakers 22 of the display unit 20. For display units 20 to be installed in the toilet rooms as shown in FIG. 2, the duration of each video file can be last for 1 to 3 minutes. For display units 20 to be installed in front of the urinal as shown in FIGS. 3A and 3B, the video files are preferred to have a shorter period of time, such as 15 to 30 seconds.

The input or transmission of the electronic information can be done by using the latest technologies available including, but not limited to, Internet, networking cable, satellite, and wireless technologies. The information center 30 also provides a schedule to post the electronic information in different time periods. Therefore, the electronic information that is scheduled by the information center 30 is to be displayed at the time when the display unit 20 is activated by the sensing means.

For example, a restaurant owner is able to build the auto-control display device in his or her lavatory in order to promote his or her own service or product, wherein the electronic information, such as a "today special menu" or a "dinner menu", is preset in the information center 30 such that when the user uses the lavatory, the sensing means 10 detects the use of lavatory system so as to automatically activate the display screen to display the preset electronic information. Therefore, the user is able to view the video display of the electronic information while the lavatory system is in use.

When the sensing means 10 detects that the user finishes using and leaves the lavatory system, the sensing means 10 will send signal to the information center 30 to deactivate the display unit 20 by either switching off the display unit 20 or switching the display unit 20 to a standby mode. When the sensing means 10 detects that another user uses the lavatory system, the display unit 20 will be switched on again to display the electronic information. In other words, the auto-control display device will be activated whenever the lavatory system is in use by a user.

It is worth mentioning that any advertiser, such as a manufacturer or retailer, can place an advertisement on the display unit 20 by contracting with the owner of the lavatory or the central control centers, such that the advertiser is able to place an advertisement in a location where the advertiser will be able to reach its target audience for maximum exposure. For example, a soft drink and/or brewing company can place an advertisement in the lavatory of a restaurant and/or bar that is activated when the lavatory system is in use. Therein, the user will be exposed to an advertisement of products that are sold in that restaurant and/or bar. Therefore, the advertisers can post their advertisement in the right place for the correct audience. In other words, the limited advertisement budget of the advertiser can be spent effectively and economically by just advertising a preferred establishment while the maximum target audience can see the electronic information.

As shown in FIG. 2, the auto-control display device is incorporated with the flush actuation device of the lavatory system, wherein the flush actuation device is an auto flush actuation device to automatically flush the toilet after the use of the lavatory system. Accordingly, the flush actuation device comprises a solenoid or a motor to actuate a flushing mechanism to open a water valve for allowing water flowing to the toilet so as to flush the toilet.

According to the preferred embodiment, the flush actuation device is electrically connected to the sensing means 10 as a switch such that the flush actuation device of the lavatory system is automatically actuated to flush the toilet after the use of the lavatory system. In other words, the sensing means 10 not only control the display unit 20 but also the flush actuation device at the same time, such that the display unit 20 will be switched off or switched to standby mode while flushing the toilet simultaneously after the sensing means 10 detects the user finishes using the lavatory system. It is worth mentioning that due to growing hygiene in a public lavatory, the user does not have to touch the display unit 20 in order to activate the auto-control display device for viewing the electronic information, so as to eliminate human contact with the fixtures that may contain disease spreading bacteria.

It is worth mentioning that the auto-control display device is incorporated with the lavatory system which comprises a toilet, wherein the display unit 20 is positioned at the eye viewing location of the user when the user sits on the toilet. For example, the display unit 20 is mounted on a door or a wall that faces toward the user, as shown in FIG. 2. However, the auto-control display device is capable of incorporating with the lavatory system which comprises a urinal. Generally speaking, the urinal is usually used in the men's lavatory allowing the user to stand in front of the urinal. Therefore, the display unit 20 may comprise a smaller LCD screen mounted at a position facing toward the user, as shown in FIGS. 3A and 3B. It is worth mentioning that the auto-control display device can be built in with the auto flush actuation device such that the display unit 20 is adjustable and is movably mounted to the auto flush actuation device at a position above the urinal, as shown in FIG. 3A. Otherwise, the display unit 20 is mounted on the wall above the urinal while the sensing means 10 is built-in with the auto flush actuation device, as shown in FIG. 3B.

Alternatively, when the sensing means 10 is built-in with the flush actuation device, the auto-control display device is capable of incorporating with the existing sensing means 10 so that the existing lavatory system does not need to be altered from the original configuration in order to incorporate with the auto-control display device of the present invention.

The present invention further provides a method of posting electronic information by the auto-control display device through a public service area; which comprises the steps of:

(1) Provide a plurality of regional display units 20 in a plurality of regional service centers each having a service area, wherein each of the regional display units is positioned at an eye viewing location in the respective service.

(2) Network a central control center with the regional display units in the regional service centers, wherein each of the regional service centers is maintained and controlled by the central control center and provided with at least an electronic information.

(3) Sense a presence of an audience within the respective service area.

(4) Activate the respective display unit 20 to display the electronic information.

Figure 4:
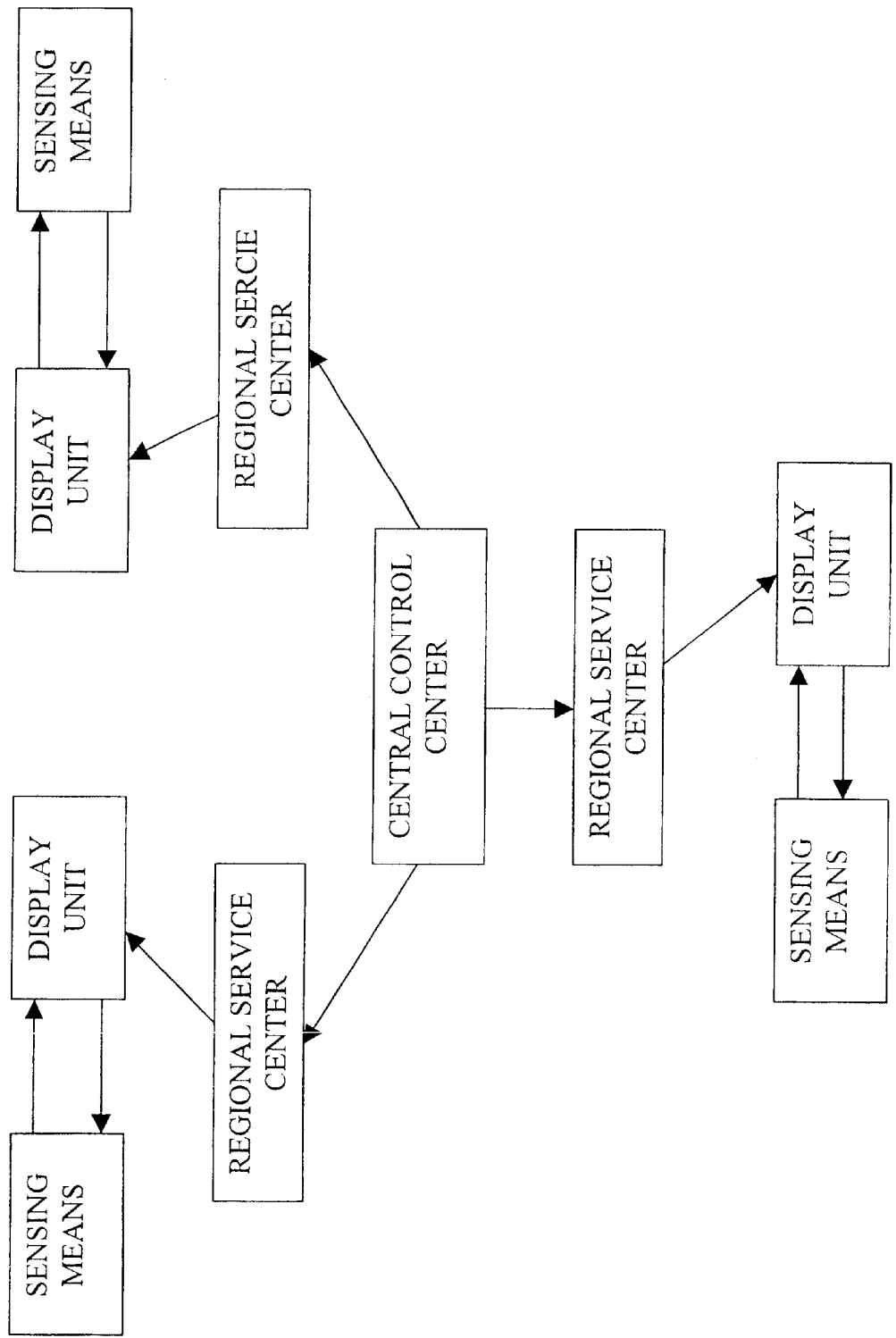
FIG. 4 is a block diagram of a method of posting an electronic information by the auto-control display according to the above preferred embodiment of the present invention.

According to the preferred embodiment, the present invention is expandable outside the lavatory system. It can be used in a shopping center, bus station, or any other public service area, as shown in FIG. 4. In step (1), the display units 20 are located at different service areas wherein the regional service centers are networked with the central control center through a network system. The display units 20 will be set at an eye viewing location with the regional service center.

The electronic information is preferably stored in the information center 30 in the regional service center, wherein the electronic information is maintained and controlled by the central control center. In other words, the advertiser is able to select the advertisement posted in the particular territory such as in the lavatory and/or the hallway of the shopping center. However, the information center 30 can be located at the central control center such that the central control center can monitor and control each of the display units 20 to display the corresponding electronic information.

In steps (3) and (4), when the sensing means 10 detects the user or audience, which is a potential customer located within the service area, the respective display unit 20 is switched on to display the electronic information. However, when the user or audience leaves the service area, the display unit 20 is automatically switched off or switched to the standby mode. The display unit 20 maintains standby mode until being activated again.

It is worth to mention that the audience located at the lavatory may view electronic information that differs from the electronic information viewed by the audience in the hallway of the shopping center. This allows the audience to view different electronic information at different regional service centers.

Moreover, if more than one electronic information are scheduled to be displayed in sequence within a certain period of advertising time, the display unit 20 may display the respective electronic information scheduled to be displayed at the time when the display unit 20 is activated by the sensing means 10.

For example, the advertiser may post the advertisement of female underwear at the lady lavatory of the regional service center so that when women visit the lady lavatory, they are capable of viewing the corresponding electronic information. Likewise, promotion advertisements of stores in a shopping center can be posted in the hallway of the shopping center of the regional service center, such that the shoppers are able to learn which shop in the shopping center has the promotion discount or activity.

Of course, before posting the advertisement on the auto-control display device, a posting order placed by the advertiser must be accepted by the central control center, wherein the central control center obtains information of where and when is each of the electronic information available at the regional service centers. Therefore, the electronic information will be scheduled to display at an advertising time in the respective regional service center. In other words, within the advertising time, the display unit 20 will display the corresponding electronic information once the sensing means 10 detects any audience within the service area.

The auto-control display device further comprises a counting device 40 electrically linked with the information center 20 wherein the counting device 40 is arranged to determine the frequency amount of use of the display unit 20. Therefore, the advertiser is able to obtain statistical feedback from the central control center of the auto-control display device.

What is claimed is:

1. An auto-control display device for a lavatory system in a service area, comprising:

a display unit positioned at an eye viewing location with said service area, wherein said display unit is provided in a regional service center;

a central control center communicatively connecting with said display unit through a communication network such that said display unit is adapted to network with another display unit of said respective regional service center through said central control center, wherein said regional service center is maintained and controlled by said central control center, wherein said central control center comprises an information center connecting to said display unit for storing at least an electronic information such that when said display unit is activated, said information center sends said electronic information to said display unit through said communication network for displaying said electronic information on said display unit; and a sensing means, which is electrically connected to an auto flush actuation device of said lavatory system to actuate said auto flush actuation device to flush said lavatory system after a use of said lavatory system is completed and simultaneously controls said display unit to display said electronic information, wherein when said sensing means detects the use of said lavatory system, said information center automatically activates said display unit to display said electronic information, and when said sensing means detects that the use of said lavatory system is completed and actuates said auto flush actuation device to flush said lavatory system, said display unit is simultaneously and automatically deactivated by said information center.

2. The auto-control display device, as recited in claim 1, wherein said display unit comprises a display screen capable of displaying full color graphics, text, and video and including sound capabilities.

3. The auto-control display device, as recited in claim 1, wherein a schedule of said electronic information is arranged by said information center in such a manner that when said display unit displays said respective information in accordance with said schedule at the time when said display unit is activated by said sensing means.

4. The auto-control display device, as recited in claim 2, wherein a schedule of said electronic information is arranged by said information center in such a manner that when said display unit displays said respective information in accordance with said schedule at the time when said display unit is activated by said sensing means.

5. The auto-control display device, as recited in claim 1, further comprising a counting device electrically linked with said information center wherein said counting device is arranged to determine an amount of use of said display unit to display said electronic information.

6. The auto-control display device, as recited in claim 3, further comprising a counting device electrically linked with said information center wherein said counting device is arranged to determine an amount of use of said display unit to display said electronic information.

7. The auto-control display device, as recited in claim 4, further comprising a counting device electrically linked with said information center wherein said counting device is arranged to determine an amount of use of said display unit to display said electronic information.

8. A lavatory system, comprising:

an auto flush actuation device;

a sensing means which is electrically connected to said auto flush actuation device of said lavatory system to actuate said auto flush actuation device to flush said lavatory system after a use of said lavatory system is completed; and an auto-control display which comprises:

a display unit which is interacted with said sensing means of said lavatory system and positioned at an eye viewing location within a service area where said lavatory system is located, wherein said display unit is provided in a regional service center; and a central control center communicatively connecting with said display unit through a communication network such that said display unit is adapted to network with another display unit of said respective regional service center through said central control center, wherein said regional service center is maintained and controlled by said central control center, wherein said central control center comprises an information center connecting to said display unit for storing at least an electronic information such that when said display unit is activated, said information center sends said electronic information to said display unit through said communication network for displaying said electronic information on said display unit, wherein when said sensing means detects the use of said lavatory system, said information center automatically activates said display unit for displaying said electronic information, and when said sensing means detects that the use of said lavatory system is completed and actuates said auto flush actuation device to flush said lavatory system, said display unit is simultaneously and automatically deactivated by said information center.

9. The lavatory system, as recited in claim 8, wherein said display unit comprises a display screen capable of displaying full color graphics, text, and video and including sound capabilities.

10. The lavatory system, as recited in claim 8, further comprising a counting device electrically linked with said information center wherein said counting device is arranged to determine an amount of use of said display unit to display said electronic information.

11. The lavatory system, as recited in claim 9, further comprising a counting device electrically linked with said information center wherein said counting device is arranged to determine an amount of use of said display unit to display said electronic information.

12. A method of positing electronic information at a lavatory system comprising an auto flush actuation device, comprising the steps of:

(a) providing one or more regional display units in one or more regional services centers each having a service area, wherein each of said regional display units is positioned at an eye viewing location in said respective service area;

(b) networking a central control center with said regional display units in said regional service centers, wherein each of said regional service centers is maintained and control by said central control center and provided with at least an electronic information, wherein said central control center is communicatively connecting with said regional display units through a communication network, wherein said central control center comprises an information center for storing at least an electronic information therein such that when one of said regional display units is activated, said information center sends said electronic information to said respective regional display unit through said communication network for displaying said electronic information on said respective regional display unit;

(c) receiving a first signal from said auto flush actuation device when a use of said lavatory system is detached by sensing a presence of an audience within said respective service area;

(d) activating said respective display unit to display said electronic information;

(e) receiving a second signal from said auto flush actuation device when said auto flush actuation device is actuated to flush said lavatory system after sensing the use of said lavatory system is completed; and (f) simultaneously and automatically deactivating said display unit from displaying said electronic information.

13. The method, as recited in claim 12, wherein said display unit comprises a display screen capable of displaying full color graphics, text, and video and including sound capabilities.

14. The method as recited in claim 12, before the step (c), further comprising the steps of:

accepting posting orders placed from advertisers by said central control center, wherein said central control center obtains information of where and when said electronic information is available at said regional service centers; and scheduling said electronic information to be displayed on said display unit at said respective regional service center within a predetermined time by said central control center.

15. The method as recited in claim 13, before the step (c), further comprising the steps of:

accepting posting orders placed from advertisers by said central control center, wherein said central control center obtains information of where and when said electronic information is available at said regional service centers; and scheduling said electronic information to be displayed on said display unit at said respective regional service center within a predetermined time by said central control center.

16. The method, as recited in claim 14, further comprising a step of sending a statistical feedback from said central control center to said advertiser wherein said feedback contains an amount of the use of said display unit to display said electronic information at said respective regional service center within said predetermined time.

17. The method, as recited in claim 15, further comprising a step of sending a statistical feedback from said central control center to said advertiser wherein said feedback contains an amount of the use of said display unit to display said electronic information at said respective regional service center within said predetermined time.

* * * * *